(12) United States Patent
Wells et al.

(10) Patent No.: US 10,308,527 B2
(45) Date of Patent: Jun. 4, 2019

(54) METAL-ORGANIC FRAMEWORKS FOR ADSORPTION OF LIQUID PHASE COMPOUNDS

(71) Applicant: Northwestern University, Evanston, IL (US)

(72) Inventors: Daniel Morgan Wells, Charlotte, NC (US); Paul L. Frattini, Los Altos, CA (US); Keith Paul Fruzzetti, San Jose, CA (US); Omar Farha, Glenview, IL (US); Joseph T. Hupp, Northfield, IL (US); Ashlee J. Howarth, Evanston, IL (US); Michael J. Katz, St. John's (CA)

(73) Assignee: Northwestern University, Evanston, IL (US)

( * ) Notice: Subject to any disclaimer, the term of this patent is extended or adjusted under 35 U.S.C. 154(b) by 205 days.

(21) Appl. No.: 15/094,980

(22) Filed: Apr. 8, 2016

(65) Prior Publication Data

US 2016/0318773 A1    Nov. 3, 2016

Related U.S. Application Data

(60) Provisional application No. 62/146,275, filed on Apr. 11, 2015.

(51) Int. Cl.
*C02F 1/28* (2006.01)
*B01J 20/22* (2006.01)
(Continued)

(52) U.S. Cl.
CPC ............. *C02F 1/285* (2013.01); *B01J 20/226* (2013.01); *C02F 2001/422* (2013.01); *C02F 2101/106* (2013.01); *C02F 2103/18* (2013.01)

(58) Field of Classification Search
CPC ................................ C02F 1/285; B01J 20/226
See application file for complete search history.

(56) References Cited

U.S. PATENT DOCUMENTS 6,893,564 B2    5/2005  Mueller et al.
9,815,222 B2 *  11/2017  James ..................... B29B 7/005
(Continued)

FOREIGN PATENT DOCUMENTS

WO    WO 2015/036770    3/2015

OTHER PUBLICATIONS

Carboni et al., "Highly porous and stable metal-organic frameworks for uranium extraction," Chem. Sci., 2013, 4, 2396-2402.*
(Continued)

*Primary Examiner* — Chester T Barry
(74) *Attorney, Agent, or Firm* — Owens Law Firm, PC

(57) ABSTRACT

The present invention provides a metal-organic framework (MOF) for use in removing particular chemical species or compounds from a liquid. In particular, the present invention provides an MOF having a molecular formula of $Zr_6(\mu_3\text{-}O)_4 (\mu_3OH)_4(OH)_4(H_2O)_4(TBAPy)_2$, wherein TBAPy is 1,3,6,8-tetrakis (p-benzoic-acid)pyrene, (known as NU-1000) for use in complexing selenate or selenite from a liquid or liquid stream. Further, the selenium based oxy-anions are removed to concentrations below that specified for wastewater discharge by the U.S. Environmental Protection Agency for flue gas desulfurization operations in the fossil fueled electric power generation industry. Such water treatment results are achieved even in the presence of competing sulfate anion challenges and at elevated temperatures comparable to condensate cooling water.

18 Claims, 12 Drawing Sheets

(51) Int. Cl.
    *C02F 1/42*     (2006.01)
    *C02F 103/18*   (2006.01)
    *C02F 101/10*   (2006.01)

(56) References Cited

U.S. PATENT DOCUMENTS

| | | | |
|---|---|---|---|
| 2013/0334134 A1* | 12/2013 | Mierzejewski | C02F 1/441 210/607 |
| 2014/0319058 A1 | 10/2014 | Taylor-Pashow et al. | |
| 2015/0031908 A1 | 1/2015 | Bury et al. | |
| 2016/0152493 A1* | 6/2016 | Szykowny | C02F 1/4695 210/669 |
| 2016/0160348 A1* | 6/2016 | Siu | B01J 20/226 521/50 |

OTHER PUBLICATIONS

Schaate et al., "Modulated Synthesis of Zr-Based Metal-Organic Frameworks: From Nano to Single Crystals," Chem. Eur. J., 2011, 17,6643-6651.*

J. E. Mondloch, W. Bury, D. Fairen-Jimenez, S. Kwon, Erica J. DeMarco, Mitchell H. Weston, Amy A. Sarjeant, A. A. Sarjeant, SonBinh T. Nguyen, P. Stair, Randall Q. Snurr, O. K. Farha and J. T. Hupp, "Vapor-Phase Metalation by Atomic Layer Deposition in a Metal-Organic Framework," J. Am. Chem. Soc. 2013, 135, 10294-10297.

P. Deria, J. E. Mondloch, E. Tylianakis, P. Ghosh, W. Bury, R. Q. Snurr, J. T. Hupp and O. K. Farha, "Perfluoroalkane Functionalization of NU-1000 via Solvent-Assisted Ligand Incorporation: Synthesis and CO2 Adsorption Studies," J. Am. Chem. Soc. 2013, 135, 16801-16804.

P. Deria, W. Bury, J. T. Hupp and O. K. Farha, "Versatile Functionalization of the NU-1000 Platform by Solvent-Assisted Ligand Incorporation," Chem. Commun. 2014, 50, 1965-1968.

P. Deria, J. E. Mondloch, O. Karagiaridi, W. Bury, J. T. Hupp and O. K. Farha, "Beyond Post-Synthesis Modification: Evolution of Metal-Organic Frameworks via Building Block Replacement," Chem. Soc. Rev. 2014, 43, 5896-5912.

J. E. Mondloch, M. J. Katz, N. Planas, L. Gagliardi, J. T. Hupp and O. K. Farha, "Are Zr6-based MOFs water stable? Linker hydrolysis vs. capillary-force-driven channel collapse," Chem. Commu. 2014, 50, 8944-8946.

N. Planas, J. E. Mondloch, S. Tussupbayev, J. Borycz, C. J. Cramer, O. K. Farha, J. T. Hupp and L. Gagliardia, "Defining the Topology of the Zr6-Based Metal-Organic Framework NU-1000," J. Phys. Chem. Let. 2014, 5, 3716-3723.

P. Deria, W. Bury, I. Hod, C-W. Kung, O. Karagiaridi, J. T. Hupp and O. K. Farha, "MOF Functionalization via Solvent-Assisted Ligand Incorporation: Phosphonates vs. Carboxylates," Inorg. Chem. 2015, 54, 2185-2192.

Katz, M. J.; Brown, Z. J.; Colón, Y. J.; Siu, P. W.; Scheidt, K. A.; Snuff, R. Q.; Hupp, J. T.; Farha, O. K. "A Facile Synthesis of UiO-66, UiO-67 and Their Derivatives," Chem. Commun. 2013, 49, 9449-9451.

Awual, Md. Rabiul et al., "Ultimate selenium(IV) monitoring and removal from water using a new class of organic ligand based composite adsorbent," J. Hazardous Materials, 2015, vol. 291, 111-119.

Suzuki, Toshishige M. et al., "Adsorption and removal of oxoanions of arsenic and selenium on the zirconium(1v) loaded polymer resin functionalized with diethylenetriamine-N,N,N',N'-polyacetic acid," J. Environ. Monit. 2000, 2, 550-555.

* cited by examiner $\eta_2\mu_2$        $\mu_2$

Figure 9A
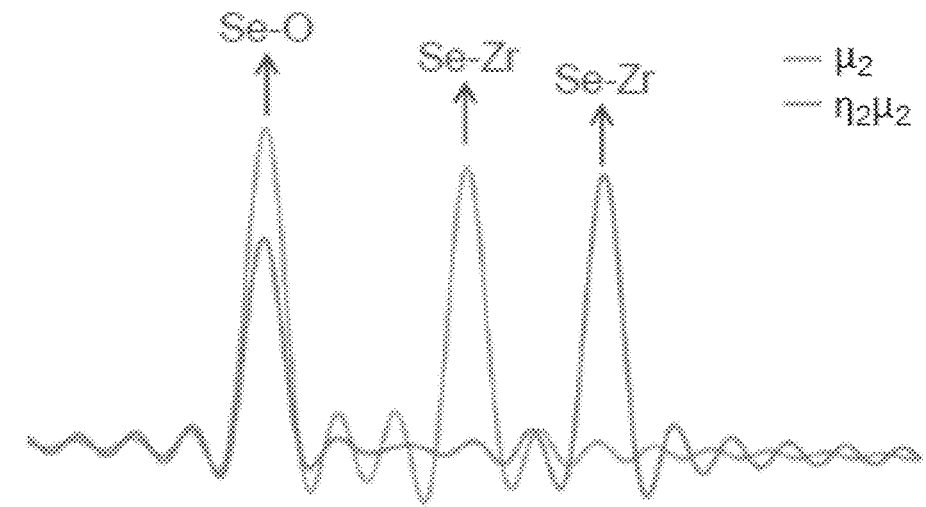
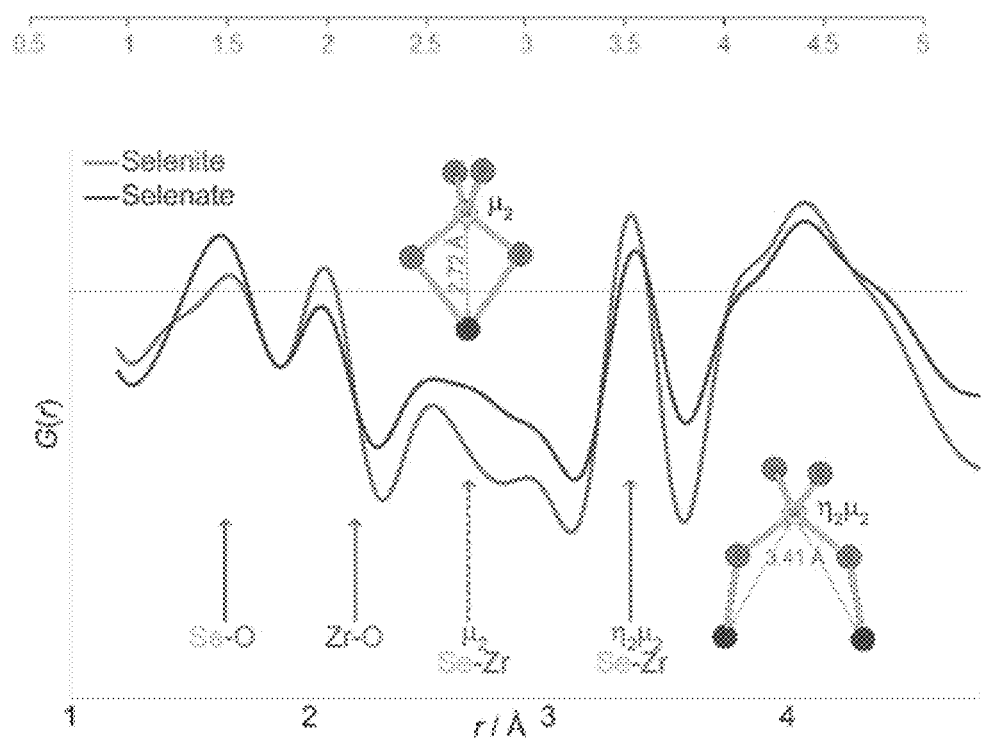
Figure 9B

METAL-ORGANIC FRAMEWORKS FOR ADSORPTION OF LIQUID PHASE COMPOUNDS

CROSS REFERENCE TO RELATED APPLICATIONS

This application claims the benefit of U.S. Provisional Application No. 62/146,275, filed Apr. 11, 2015, the content of which is incorporated by reference herein in its entirety.

BACKGROUND OF THE INVENTION

Field of the Invention

The present invention and its embodiments relate to the removal of a given chemical species from a liquid. In particular, the present invention and its embodiments relate to the use of a metal-organic framework having particular properties suitable for adsorption of a given chemical species from a liquid stream.

Description of Related Art

Nuclear utilities are challenged with the removal of several impurities that significantly contribute to or drive dose, radioactive waste generation, environmental effluent waste concerns, and materials degradation issues. Analogously, fossil based power generation facilities are challenged by the regulatory discharge requirements for wastewater from flue gas desulfurization and from scrubber, fireside washing, and boiler cleaning operations, as well as by the mandates for groundwater remediation due to coal pile run-off and ash pond leachates. Current technologies (e.g, ion exchange) lack the ability to remove these impurities to the extent needed due to factors associated with the mechanism of capture and competition with other impurities.

Recently developed sequestration media offer organometallic ligands decorated on resin backbones (in the locations which would otherwise bear a cation exchange group) that are significantly improved removal media for analytes that are cations like cobalt. Unfortunately, such ligands cannot accommodate the larger geometry of oxy-anions of species like selenium that are found in the subject water streams. For example, ion exchange and adsorption technologies are typically used to capture chemical impurities in water streams. However, these technologies are subject to several significant drawbacks. They are non-specific (i.e., will capture many different species to some degree), subject to competition (i.e., higher concentration species will dominate), and are reversible (i.e., captured species will be released given changes in water conditions).

Nonetheless, removal of selenium from water streams is of particular interest. Selenium is a naturally occurring element that is essential, in low concentrations, for human health. Of all essential elements however, selenium has the most confining range between dietary deficiency (<40 μg/day) and toxicity (>400 μg/day). Selenium enters our waterways through a number of different sources such as agricultural runoff, mining, industrial production, and via flue gas desulfurization processes. As a consequence of the narrow range between deficiency and toxicity, it is very important to monitor and control the amount of bioavailable selenium in our drinking water. The U.S. Environmental Protection Agency recognizes the dangers of selenium and has mandated the maximum acceptable level for selenium in drinking water to 50 ppb. However, in more recent proposals, regulatory plans to reduce selenium discharge requirements to 14 ppb and then as low as 10 ppb, making the present operation of many flue gas desulfurization wastewater cleanup facilities incapable of achieving such purity without methods beyond typical ion exchange or adsorption engineering unit operations.

Selenium can occur in both organic and inorganic forms, but the high solubility and hence bioavailabilty of inorganic species such as selenite ($SeO_3^{2-}$) and selenate ($SeO_4^{2-}$) makes these anions the primary focus of remediation techniques. Many techniques have been explored for the removal of selenite and selenate from water including the use of vertical flow wetlands and bioreactors, but high start-up costs and size requirements have limited the application of these techniques. An alternative approach that has been investigated involves using an adsorbing media to soak up and remove unwanted inorganic selenium. Iron oxides (hematite, goethite, and ferrihydrite) have been studied extensively as potential adsorbents for selenite and selenate in aqueous solutions. These iron-based materials have very low surface areas, meaning that a lot of the material is wasted due to the lack of available adsorption sites. Iron oxides also tend to be effective for selenite removal due to the formation of inner-sphere complexes between the selenite anion and iron oxide surface while selenate removal is not as sufficient because only weak, outer-sphere interactions occur.

Therefore, a novel technology is needed that effectively and efficiently removes specific impurities from water and other liquid streams in the presence of other competing species, and in a manner that specifically targets capture of that impurity—holding it with a much higher binding energy. In particular, a different type of structural media is required to specifically address removal of low levels of particular species, such as aqueous oxy-anions of selenium, with high enough binding energy to maintain near irreversible uptake as analyte concentrations are lowered while competitor concentrations are simultaneously raised.

BRIEF SUMMARY OF THE INVENTION

The present invention provides for the use of a metal-organic framework (MOF) in removing particular chemical species or compounds, in particular oxy-anions of selenium, including selenite ($SeO_2^{2-}$) and selenate ($SeO_4^{2-}$) from a liquid. In one embodiment, the present invention provides for the use of a metal-organic framework for removing selenate or selenite from a liquid stream. In particular, the present invention provides a method to reduce the concentration of selenate or selenite in a liquid stream, comprising contacting a liquid stream comprising selenate or selenite with a structure comprising an MOF having a molecular formula of $Zr_6(\mu_3\text{-}O)_4(\mu_3OH)_4(OH)_4(H_2O)_4(TBAPy)_2$, wherein TBAPy is 1,3,6,8-tetrakis (p-benzoic-acid)pyrene (known as NU-1000); and complexing at least a portion of the selenate or selenite onto the metal-organic framework, either by binding to the zirconium derived nodal features of the MOF structure or by binding to specialized ligands tethered to the node of the MOF and providing a ligand selective for selenium oxy-anion uptake, or both, thereby reducing the concentration of the selenate or selenite in the liquid stream. The ability of NU-1000 to reduce the concentration of selenate and selenite in water provides for a more environmentally acceptable water stream.

The present invention also features additional capability of reducing selenate and selenite concentrations in an aqueous liquid stream to ultra-low levels when the stream also comprises competing species such as sulfate, wherein the selenate and selenite effluent concentrations are able to be maintained low even when sulfate concentration initially exceeds the effluent selenate and selenite concentrations. The present invention further achieves the required selenate and selenite concentrations even as temperature is raised from room temperature to more frequently encountered processing temperatures of condensate cooling waters in typical electrical power generation plants. The present invention also includes potential embodiments wherein one skilled in the art should be able to apply known methodologies to reduce the commercial cost of using the NU-1000 MOF for water treatment applications by either applying regeneration procedures known in the art on NU-1000 media previously exposed to selenate and selenite or by applying metalation chemistries known in the art to substitute less costly metal constituents in the MOF, such as Hafnium (Hf) for Zirconium(Zr), or both.

BRIEF DESCRIPTION OF THE SEVERAL VIEWS OF THE DRAWINGS

FIG. 9A illustrates calculated differential pair distribution functions (PDFs) for selenite and selenate-loaded NU-1000;

FIG. 9B illustrates experimental differential PDFs for selenite and selenate-loaded NU-1000 only showing peaks at distances matching $\eta_2\mu_2$ binding;

DETAILED DESCRIPTION OF THE INVENTION

The present invention is more fully described below with reference to the accompanying drawings. While the invention will be described in conjunction with particular embodiments, it should be understood that the invention can be applied to a wide variety of applications, and it is intended to cover alternatives, modifications, and equivalents within the spirit and scope of the invention and the claims. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

In general, the present invention is directed to a metal-organic framework (MOF) for use in removing particular compounds from a liquid or liquid stream, in particular, oxy-anions of selenium, including selenite ($SeO_3^{2-}$) and selenate ($SeO_4^{2-}$). In one embodiment, the present invention provides for the use of a compound comprising a metal-organic framework, known as NU-1000, having a molecular formula of $Zr_6(\mu_3-O)_4(\mu_3-OH)_4(OH)_4(H_2O)_4(TBAPy)_2$, wherein TBAPy is 1,3,6,8-tetrakis (p-benzoic-acid)pyrene, to complex with oxy-anions, specifically oxy-anions of selenium, including selenite ($SeO_3^{2-}$) or selenate ($SeO_4^{2-}$) or both existing in a given liquid or liquid stream, thereby at least reducing the concentration of these species in the liquid or liquid stream.

Figure 1:
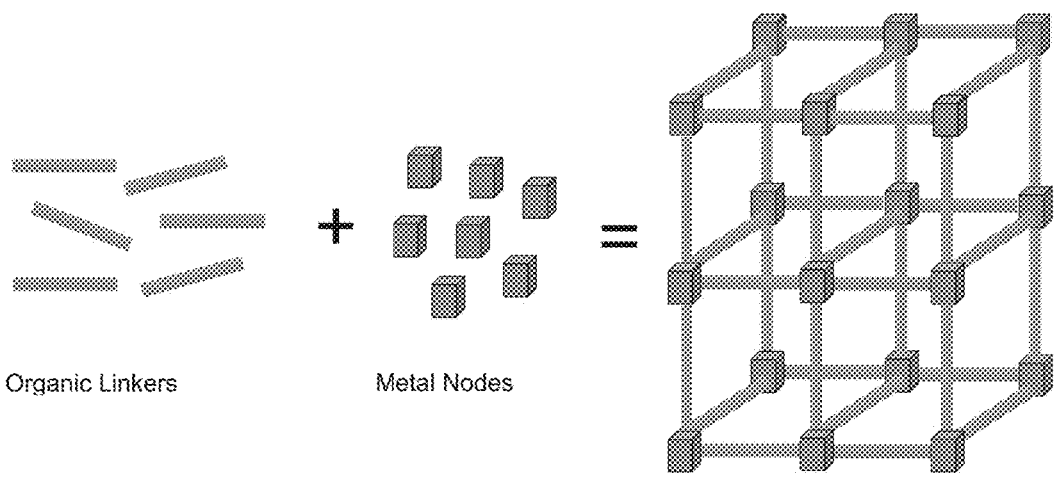
FIG. 1 illustrates a metal organic framework (MOF) according to one embodiment of the present invention.

FIG. 1 illustrates a MOF according to one embodiment of the present invention. MOFs are structurally diverse, porous materials that are constructed from metal nodes bridged by organic linkers. MOFs are composed of multitopic organic linkers and metal-based nodes that are interconnected by coordination bonds of moderate strength. In terms of adsorption or complexation of analyte molecules from aqueous solutions, MOFs containing zirconium metal nodes are of interest due to their inherent stability over a wide pH range in water. This stability arises from the strong Zr(IV)-O bonds, which also makes these frameworks mechanically and thermally robust to temperatures >500° C. MOFs in aqueous solution are appropriate candidate materials in either pre-coatable filter/demineralizer applications or independent packed column separation applications, which may also be consistent with use in vessels already in existence with a given plant, such as a nuclear power plant (e.g., vessels already in use for ion exchange) or a fossil fueled electricity generation plant's flue gas desulfurization wastewater treatment facility.

While the MOF may be usable in such liquid flow applications in its native structure, it is possible that the amount of pressure required to permeate packed beds of such small particles (typical size ranging from 75 to 1200 nanometers with 5 micron crystallites forming from the MOF particles) may exceed available fluid driving equipment, meaning that the MOF particles may need to be ported upon some other larger particle carrier (more of the order of a resin particle, typically 50 to 850 microns diameter in powder or bead form) such that fluid may permeate conglomerates of carrier particles more easily. One of ordinary skill in the art ought to be able to construct multiple methodologies for contacting the MOF particles onto some suitable carrier particle such that the hydraulic permeability of a conglomerate of such carrier particles, either in a columnar flow through a bed of such carrier particles or a flow through a filter providing a porous surface onto which such carrier particles are coated, is sufficiently high to afford the required fluid volumetric throughput. As such, the adsorptive properties of the MOF will still manifest since the MOF itself will be exposed to the analyte in the water stream as it flows about the carrier particles onto which the MOF media are attached.

Figure 2:
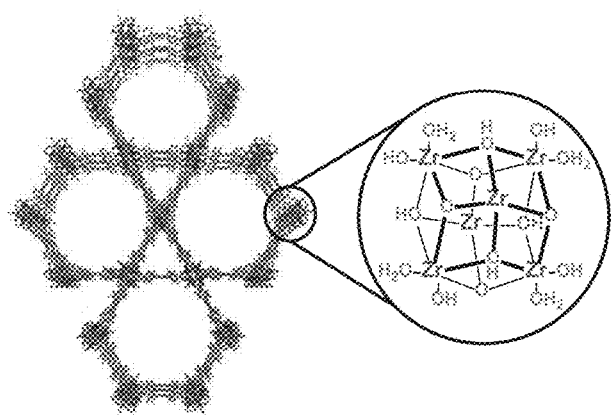
FIG. 2 illustrates a particular MOF, NU-1000.

FIG. 2 illustrates a particular MOF, NU-1000. NU-1000 is a Zr-based MOF and has the molecular formula of $Zr_6(\mu_3-O)_4(\mu_3OH)_4(OH)_4(H_2O)_4(TBAPy)_2$, wherein TBAPy is 1,3,6,8-tetrakis (p-benzoic-acid)pyrene that can be used as the MOF in the present invention. The parent-framework node of this MOF consists of an octahedral $Zr_6$ cluster capped by four $\mu_3$-OH and four $\mu_3$-O ligands. Eight of the twelve octahedral edges are connected to TBAPy units, while the remaining Zr coordination sites (after activation) are occupied by four terminal —OH and four terminal —$OH_2$ ligands. The 3D structure can be described as 2D Kagome sheets linked by TBAPy ligands. Two of the four terminal —OH groups point into the mesoporous channels, while the remaining terminal hydroxyls lie in smaller apertures between the Kagome sheets.

Figure 3:
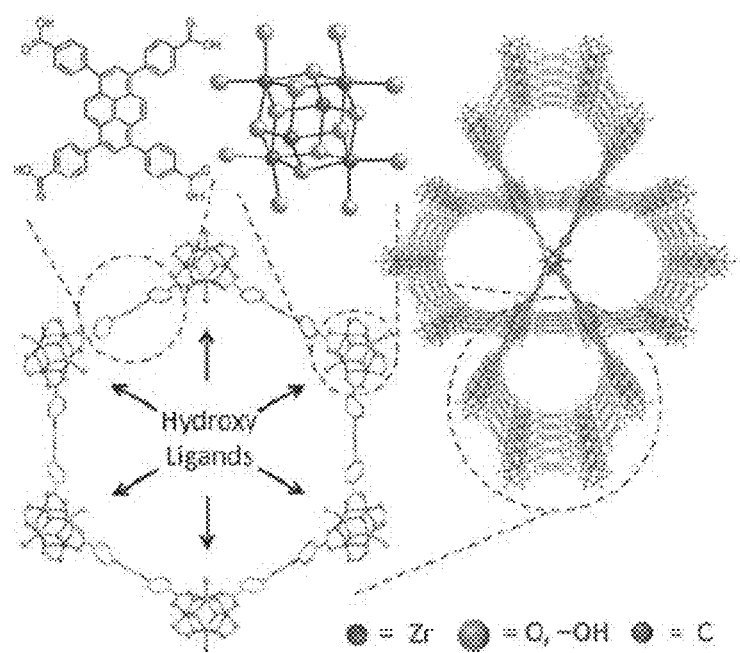
FIG. 3 illustrates structural features of the MOF, NU-1000 of FIG. 2.

FIG. 3 illustrates structural features of the MOF, NU-1000 of FIG. 2, noting that for simplicity hydrogen atoms are not shown. Further features of this MOF and its synthesis technique are described in Mondloch, J E, W Bury, D Fairen-Jimenez, S Kwon, E J DeMarco, M H Weston, A A Sarjeant, S T Nguyen, P C Stair, R Q Snurr, O K Farha and J T Hupp, "Vapor-Phase Metalation by Atomic Layer Deposition in a Metal-organic Framework", J. Am. Chem. Soc. (2013) 135, 10294-10297, which is incorporated herein by reference in its entirety. Also, structural features of this MOF are described in Planas, N.; Mondloch, J. E.; Tussupbayev, S.; Borycz, J.; Gagliardi, L.; Hupp, J. T.; Farha, O. K.; Cramer, C. J. Defining the Proton Topology of the $Zr_6$-Based Metal-Organic Framework NU-1000. J. Phys. Chem. Lett. 2014, 5, 3716-3723, which is incorporated herein by reference in its entirety.

Bare NU-1000 has surprisingly been found to complex with oxy-anions of selenium, including selenite ($SeO_3^{2-}$) and selenate ($SeO_4^{2-}$), in aqueous solutions. Results to date indicate that oxy-anions of selenium bond with significant strength so as to remove those anions down to 20 ppb levels in simple continuous stirred tank environments within reasonably and relatively fast times and to even lower concentrations, such as 10 ppb and lower, 6 ppb and lower, and 2 ppb and lower in other embodiments. The bonding for selenate and selenite are shown to be to the zirconium nodes of the MOF directly, without worry for the ligand interactions with the MOF cavity. It should be appreciated that the ability of NU-1000 to complex with selenite and selenate has been accomplished without the need for modifying the structure of NU-1000, for example, by functionalizing NU-1000 through metalation using atomic layer deposition (ALD), through solvent-assisted linker exchange (SALE), or through solvent-assisted ligand incorporation (SALI).

Figure 7:
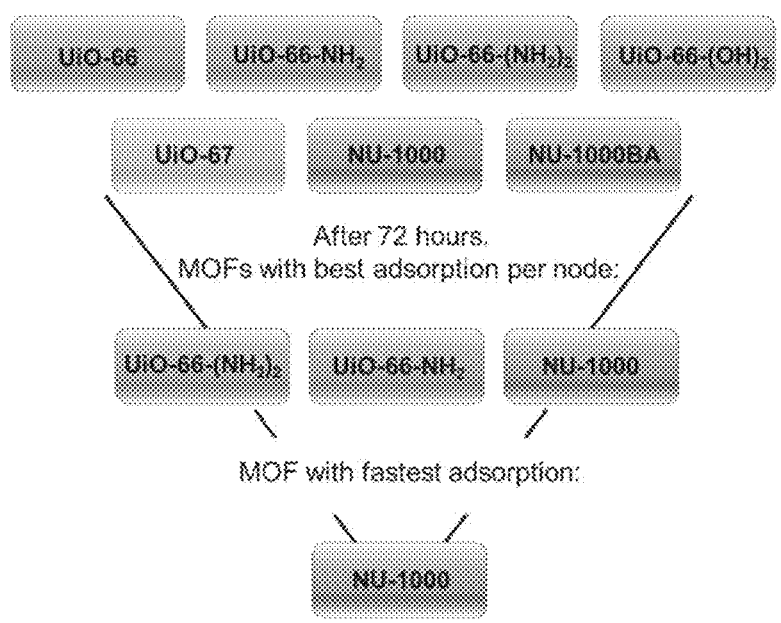
FIG. 7 illustrates a flow chart outlining the screening process for selenate and selenite adsorption in Zr-based MOFs.

Specifically, a series of zirconium-based MOFs were tested for their ability to adsorb and remove selenate and selenite anions from aqueous solutions. MOFs were tested for adsorption capacity and uptake time at different concentrations. (FIG. 7 is a flow chart outlining the screening process for selenate and selenite adsorption in Zr-based MOFs.) NU-1000 was shown to have the highest adsorption capacity, and fastest uptake rates for both selenate and selenite, of all zirconium-based MOFs in this testing.

Different ratios of adsorbent:adsorbate were tested to understand how the ratio affects uptake. Samples of 2, 4, 6, and 8 mg of NU-1000 were exposed to 10 mL solutions containing 1000 ppb Se as either $SeO_4^{2-}$ or $SeO_3^{2-}$. At all the adsorbent:adsorbate ratios tested, 98.3% or more of the $SeO_3^{2-}$ in solution is adsorbed leaving an average of 10-17 ppb in solution. Similarly, at all adsorbent:adsorbate ratios tested, 97.7% or more of the $SeO_4^{2-}$ in solution is adsorbed leaving an average of 20-23 ppb in solution. In general, these experiments show that changing the adsorbent:adsorbate ratio by 4×, at these concentration levels, does not have a significant impact on the total Se adsorbed from solution. It should be noted that throughout testing NU-1000 for Se uptake, for example studies performed at pH 6 and analogous batch studies performed using 100 ppb Se starting concentrations instead of 1000 ppb, remnant Se concentrations less than 10 ppb (down to 6 ppb and 2 ppb) have been observed when exposing 2 mg of NU-1000 to 1000 ppb and 100 ppb Se respectively. In such embodiments, the present invention may be used to reduce the total selenium concentration (i.e., the total of all selenium species) to less than 10 ppb or the amount set for suitable drinking water standards. Accordingly, the present invention may reduce the total Se concentration in a given liquid or liquid stream by more than 90%, by more than 94%, and by more than 98% in some embodiments.

Figure 4A:
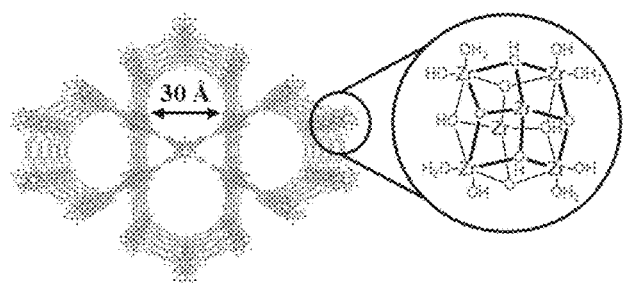
FIG. 4A illustrates a structure of NU-1000 highlighting the hexagonal pore size and the structure of the $Zr_6$ node.
Figure 4B:
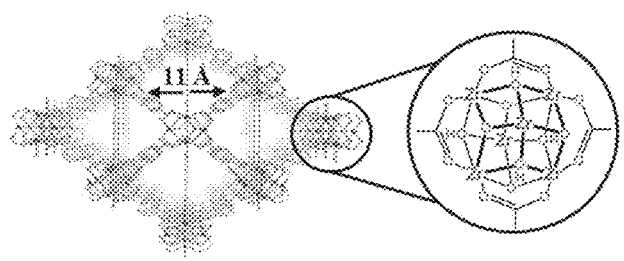
FIG. 4B illustrates a structure of UiO-66 highlighting the octahedral pore size and the structure of the $Zr_6$ node.
Figure 5:
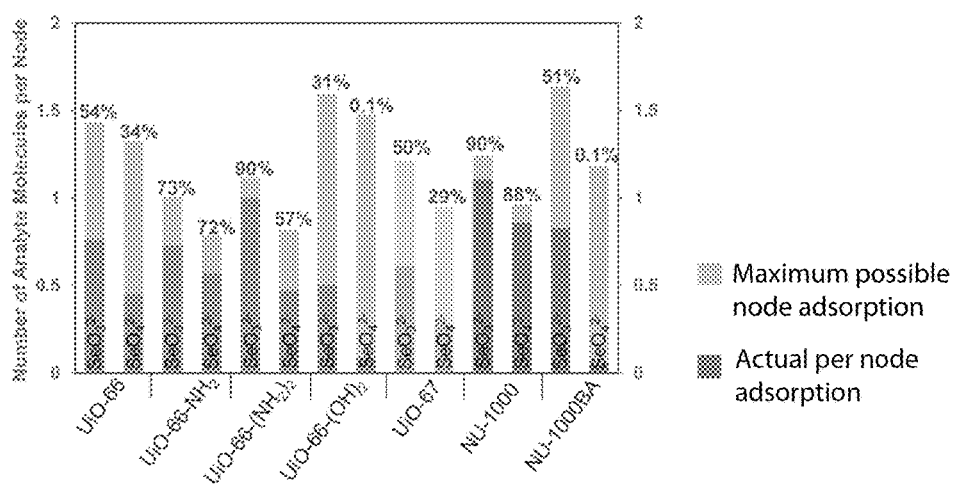
FIG. 5 is a bar graph illustrating the number of selenate or selenite molecules adsorbed per node in a series of Zr-based MOFs.

FIG. 4A illustrates a structure of NU-1000 highlighting the hexagonal pore size and the structure of the $Zr_6$ node. FIG. 4B illustrates a structure of UiO-66 highlighting the octahedral pore size and the structure of the $Zr_6$ node. Metal-organic frameworks from the NU-1000 (FIG. 4A), UiO-66 (FIG. 4B), and UiO-67 families were screened for their selenate and selenite uptake ability. For initial screening, two samples of each MOF were exposed separately to aqueous solutions of either selenate (100 ppm Se) or selenite (100 ppm Se). After 72 hours of exposure, UiO-66 adsorbed 54% and 34% of the selenite and selenate present in the respective solutions, suggesting that anion exchange is occurring both on, and within, the MOF. This demonstrates that Zr-bound hydroxides in a MOF are useful for adsorption of selenium oxy-anions, despite the strongly bridging nature of the OH group in the nodes of UiO-66. Furthermore, anion exchange appears to be enhanced by the presence of Lewis/Brnsted basic amine groups on the terephthalic acid linker with $UiO-66-(NH_2)_2$ and $UiO-66-NH_2$ showing some of the highest selenate and selenite adsorption per $Zr_6$-node among the MOFs studied (FIG. 5). Without being bound by theory, this is likely a consequence of hydrogen bonding interactions between the amine groups and selenate and selenite anions, similar to hydrogen bonding motifs in amine-containing macrocyclic frameworks which have high affinities for sulfate and selenate anions.

FIG. 5 is a bar graph illustrating the number of selenate or selenite molecules adsorbed per node in a series of Zr-based MOFs. The light colored bars indicate the maximum possible per node adsorption based on the concentration of the solution (100 ppm Se, 5 mL) and the amount of MOF present (10 mg). The dark colored bars indicate the actual per node adsorption. For additional comparison, adsorption per node is given, above each bar, as a percentage of the maximum possible adsorption. FIG. 5 shows that of the seven MOFs examined, NU-1000 achieves the highest degree of uptake of selenate as well as selenite, both gravimetrically and on a per-node basis. It also accomplishes the most complete removal of these ions from a 100 ppm Se test solution, i.e. 88% ($SeO_4^{2-}$) and 90% ($SeO_3^{2-}$). These results underscore the value and importance of MOFs with non-structural-ligand lability in accomplishing anion uptake.

Again, without being bound by theory, an alternative mode of uptake could conceivably be adsorption of the selenate/selenite sodium salt through, for example, oxy-selenium-anion/node-aqua(hydroxy) hydrogen bonding. ICP-OES (inductively coupled plasma-optical emission spectroscopy) measurements reveal no sodium adsorption in the MOF, indicating that the adsorbates cannot be salts and implying that each adsorbed oxy-selenium di-anion must be charge-balanced by loss of two anionic ligands (presumably hydroxides) from the MOF. ICP-OES measurements additionally established that no zirconium is lost to solution.

Figure 6:
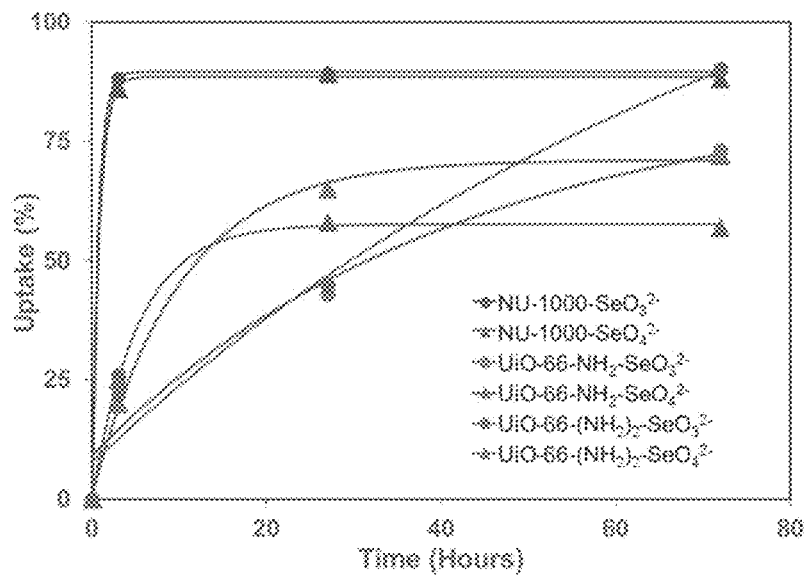
FIG. 6 is a graph illustrating the kinetics of selenate and selenite uptake in NU-1000, UiO66-$NH_2$ and UiO66-$(NH_2)_2$.

FIG. 6 is a graph illustrating the kinetics of selenate and selenite uptake in NU-1000, UiO66-$NH_2$ and UiO66-$(NH_2)_2$. In each case, 10 mg of MOF was exposed to 100 ppm Se as selenate or selenite, respectively. Given the high capacities of UiO-66-$NH_2$, UiO-66-$(NH_2)_2$, and NU-1000 for selenate and selenite, the kinetics of $SeO_x^{2-}$ uptake were also evaluated. As shown in FIG. 6, limiting high-capacity uptake from 100 ppm solutions required ca. 70 hours or more with UiO-66-$(NH_2)_2$, about 27 hours with UiO-66-$NH_2$, and less than 3 hours with NU-1000. The faster uptake by NU-1000 compared with UiO-66 and its derivatives is likely related to aperture and pore size. NU-1000 has triangular and hexagonal pores, which are 12 Å and 30 Å in diameter, respectively, with apertures of the same size (FIG. 4A), while UiO-66 comprises tetrahedral and octahedral pores that are 8 Å and 11 Å in diameter, respectively, with an aperture of 7 Å. (FIG. 4B shows the octahedral pore.) The apertures of UiO-66-$NH_2$ and UiO-66-$(NH_2)_2$ are anticipated to be even smaller. Selenate and selenite anions have radii of 2.4 Å and 2.6 Å, respectively. Therefore, based on pore size vs. analyte size alone, one would expect diffusion of selenate and selenite through the pores of NU-1000 to be faster than diffusion within UiO-66 derivatives.

Notable features for both NU-1000 and UiO-66-$NH_2$ are their ability to take up selenate and selenite with essentially equal efficacy—both kinetically and in terms of uptake capacity. The ability to adsorb both forms of inorganic selenium is an important feature for selenium remediation. The high adsorption capacity combined with fast uptake time using NU-1000 suggests that both aperture size and the presence of substitutable ligands (aqua and hydroxy groups) on the $Zr_6$ node may be important for attaining high uptake capacity and fast uptake kinetics.

Examination of the periodic table of elements would suggest that oxy-anions of the following elements might also be expected to be taken up by such MOFs like NU-1000 in a manner analogous to selenium: namely, oxy-anions of aluminum (that is, water soluble aluminum oxides/hydroxides), silicon (that is, silicates and hydrosilicates), phosphorus (such as phosphates and hydrophosphates), sulfur (that is, sulfates), chlorine (such as chlorates and perchlorates), geranium (that is, water soluble oxides/hydroxides of geranium), arsenic (such as, arsenates), tin (that is, stannates), antimony (such as antimonates and antimonites), iodine (such as iodates, per-iodates and iodites), and lead (that is, water soluble oxides/hydroxides of lead).

To gain insight into the mechanism(s) of selenate and selenite adsorption on NU-1000, maximum adsorption capacities per $Zr_6$ node were determined. When exposed to aqueous solutions containing various concentrations of selenate and selenite anions ranging from 2-7 per node, the maximum adsorption capacity of NU-1000 was found to be two anions per node (Table S1). In addition, the affinities of NU-1000 for selenate and selenite are similar under these conditions, suggesting perhaps that the two analytes are bound in a similar fashion. At initial concentrations corresponding to more than six per node (>90 ppm Se for the solution volume and the amount of sorbent examined), NU-1000 is shown to take up more than two anions per node with concomitant adsorption of sodium cations. This adsorption of sodium shows that NU-1000 can no longer inherently charge balance when adsorption beyond two anions per node occurs. In the absence of $Na^+$ co-incorporation, for each doubly-charged selenate or selenite anion adsorbed, two negative charges must be given up by the MOF to maintain charge balance. One way for NU-1000 to accommodate two selenate or selenite anions per node (−4 charge) would be to substitute all four terminal hydroxyl groups ($OH^-$) from the $Zr_6$ node; as detailed below there is likely a substitution of water molecules as well (FIG. 4A).

TABLE S1

Selenite and selenate adsorption per node in NU-1000 when exposed to various concentrations of aqueous sodium selenate and sodium selenite. *$Na^+$ was also adsorbed.

|  | Exposure-Per Node | Uptake-Per Node |
|---|---|---|
| NU-1000—$SeO_3^{2-}$ | 2 | 1.5 |
| NU-1000—$SeO_4^{2-}$ |  | 1.3 |
| NU-1000—$SeO_3^{2-}$ | 3 | 1.8 |
| NU-1000—$SeO_4^{2-}$ |  | 1.8 |
| NU-1000—$SeO_3^{2-}$ | 4 | 1.7 |
| NU-1000—$SeO_4^{2-}$ |  | 2.4* |
| NU-1000—$SeO_3^{2-}$ | 5 | 1.8 |
| NU-1000—$SeO_4^{2-}$ |  | 2.0 |
| NU-1000—$SeO_3^{2-}$ | 6 | 2.2 |
| NU-1000—$SeO_4^{2-}$ |  | 1.7 |
| NU-1000—$SeO_3^{2-}$ | 7 | 4.3* |
| NU-1000—$SeO_4^{2-}$ |  | 3.4* |

Figure 8A:
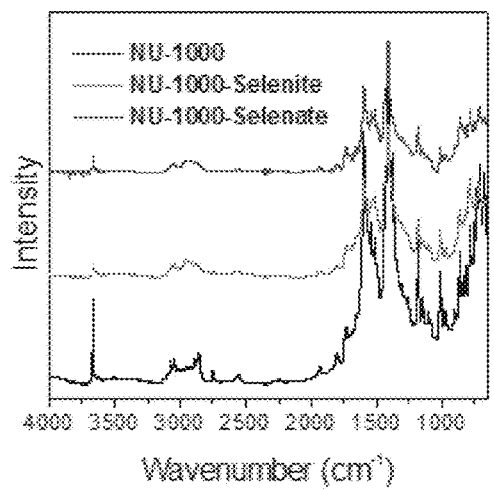
FIG. 8A illustrates DRIFTS spectrum of as-synthesized NU-1000 (lower trace) and after adsorption of two molecules of selenite (middle trace) and selenate (upper trace)
Figure 8B:
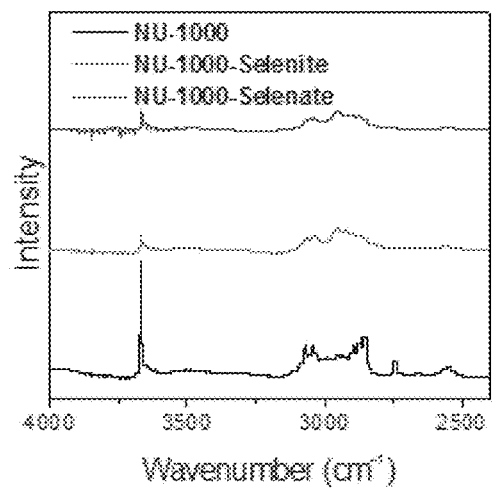
FIG. 8B illustrates DRIFTS spectrum blown up from 4000-2000 $cm^{-1}$.
Figure 8C:
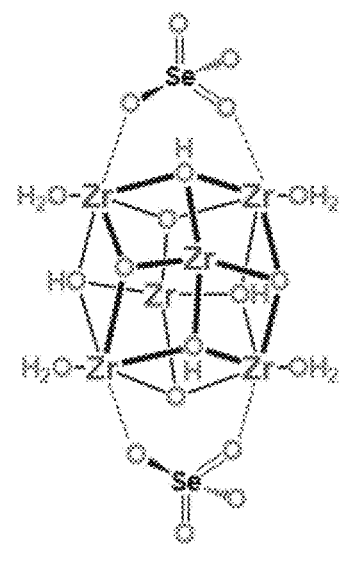
FIG. 8C illustrates potential binding modes of selenate (or selenite) to the node of NU-1000.
Figure 8C:
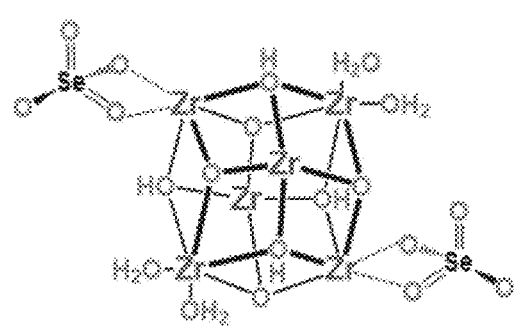

Diffuse reflectance infrared Fourier transform spectroscopy (DRIFTS) was used to gain insight into the location of the two analyte molecules per node of NU-1000. FIG. 8A illustrates DRIFTS spectrum of as-synthesized NU-1000 (lower trace) and after adsorption of two molecules of selenite (middle trace) and selenate (upper trace). FIG. 8B illustrates DRIFTS spectrum blown up from 4000-2000 $cm^{-1}$. FIG. 8C illustrates potential binding modes of selenate (or selenite) to the node of NU-1000. Prior to analyte adsorption, the IR spectrum of NU-1000 contains a sharp peak at 3670 $cm^{-1}$ (Figure A/B, lowest trace) corresponding to stretching of the nodes' terminal —OH groups (FIG. 4A). The spectrum also contains a small peak at 2745 $cm^{-1}$ (FIG. 8A/B, lower trace) corresponding to O—H stretches from hydrogen-bonding between the aqua and hydroxyl ligands in the $Zr_6$-node (FIG. 4A). After adsorption of ca. two molecules of selenate or selenite per node, the O—H stretch at 3670 cm$^{-1}$ is greatly diminished and the hydrogen-bonding based O—H stretch at 2745 cm$^{-1}$ disappears completely (FIG. 8A/B, middle and upper traces, respectively). Based on this information, it is reasonable to suggest that each $SeO_4^{2-}$ or $SeO_3^{2-}$ anion replaces two terminal hydroxyl groups on the $Zr_6$-node. Therefore, when two analyte molecules are bound per node, all four terminal hydroxyl groups are replaced and analyte binding can occur in a $\eta_2\mu_2$ or $\mu_2$ fashion (FIG. 8C).

Pair distribution function (PDF) analyses of X-ray total scattering data were used to evaluate the structural changes accompanying binding of selenate and selenite anions. FIG. 9A illustrates ccalculated differential pair distribution functions (PDFs) for selenite and selenate-loaded NU-1000. FIG. 9B illustrates experimental differential PDFs for selenite and selenate-loaded NU-1000 only showing peaks at distances matching $\eta_2\mu_2$ binding. Simulated PDFs indicate Se—Zr distances of 3.41 Å and 2.72 Å, respectively, for $\eta_2\mu_2$ and $\mu_2$ binding (FIG. 9A). The experimental PDF results, evaluated from difference data so as to isolate atom-atom distances unique to the adsorbent/adsorbate combination, showed a feature at ~3.4 Å (3.36 Å for selenite, 3.37 Å for selenate), but not at 2.7 Å, clearly indicating that these anions exclusively bind in an $\eta r_2\mu_2$ mode (FIG. 9B, wherein the curve for selenite begins higher on the left side). Both differential PDFs show peaks at ~1.7 Å assignable to the Se—O distance within the anion, and features at 2.0-2.3 Å consistent with a slight contraction of the average Zr—O distance.

Figure 10:
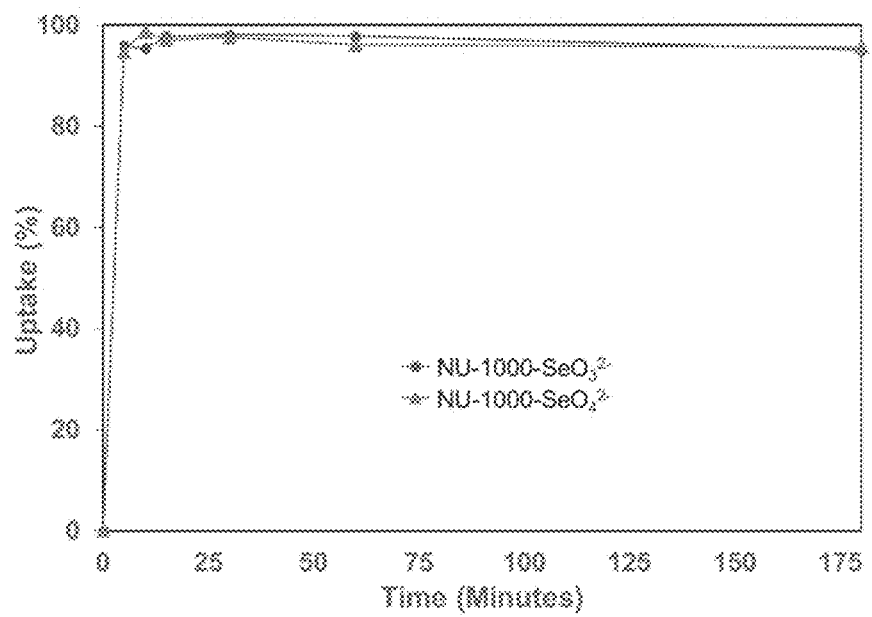
FIG. 10 illustrates selenate and selenite uptake vs. time in NU-1000 (2 mg) at low concentration and a starting concentration of 1000 ppb as Se.

FIG. 10 illustrates selenate and selenite uptake vs. time in NU-1000 (2 mg) at low concentration and a starting concentration of 1000 ppb as Se. To test if current EPA standards for selenium in water can be satisfied by using NU-1000 as a sorbent, uptake of selenate and selenite at low concentrations was also studied. When exposed to 5 mL of an aqueous solution of selenium as sodium selenite or sodium selenate at 1000 ppb, 2 mg of NU-1000 adsorbed 98% of the selenite or selenate in solution in less than 5 minutes. After 3 hours, the amount adsorbed remained constant, meaning that the anions adsorbed after 5 minutes did not subsequently leach from the sorbent. With a remnant solution concentration of only ~20 ppb selenium, test samples treated with NU-1000 meet the EPA standards for drinking water of <50 ppb selenium. It would be expected that those of skill in the art of engineering fluid cleanup equipment and the like would be able to optimize these results so as to contact the NU-1000 MOF with a continuous flow stream of aqueous solutions of selenate and selenite and to produce after suitable contact time an effluent water stream with concentration of these ions on the order of ten part per billion as selenium.

Figure 11:
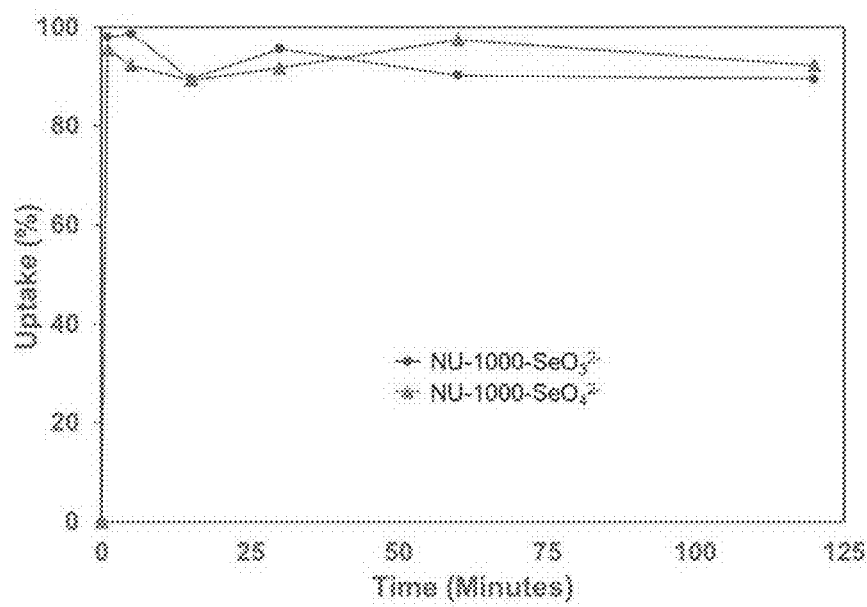
FIG. 11 illustrates selenate and selenite uptake vs. time in NU-1000 (2 mg) at low concentration and 40° C. and a starting concentration of 1000 ppb as Se.
Figure 12:
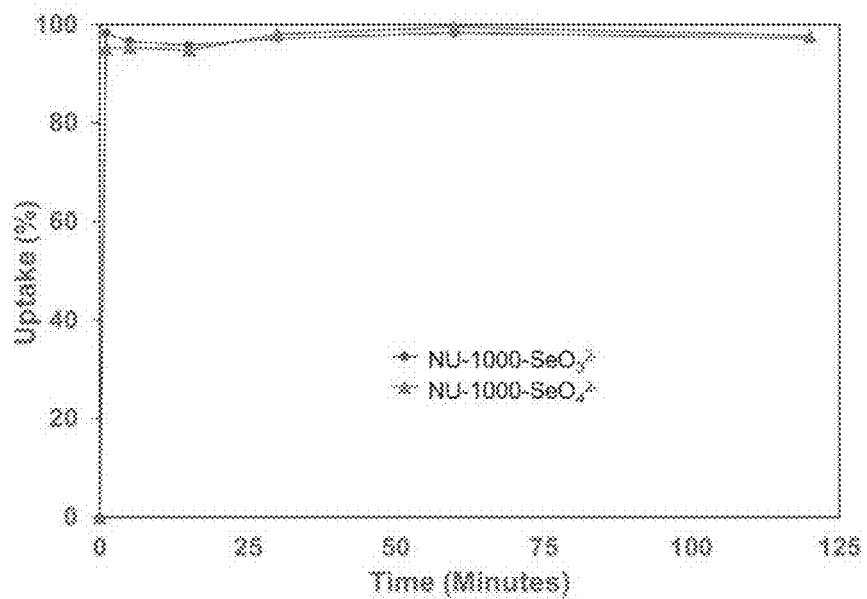
FIG. 12 illustrates the selenate and selenite uptake vs. time in NU-1000 (2 mg) at low concentration and pH 6 and a starting concentration of 1000 ppb as Se.

Adsorption of selenate and selenite by NU-1000 at low concentrations was also tested at 40° C. (FIG. 11) and pH 6 (FIG. 12) to simulate the conditions of recirculating cooling water from the flue gas desulfurization process in power plants where selenate and selenite remediation is a concern. FIG. 11 illustrates selenate and selenite uptake vs. time in NU-1000 (2 mg) at low concentration and 40° C. and a starting concentration of 1000 ppb as Se. FIG. 12 illustrates the selenate and selenite uptake vs. time in NU-1000 (2 mg) at low concentration and pH 6 and a starting concentration of 1000 ppb as Se. The successful tests showed that NU-1000 is a promising candidate for removal of selenite or selenate under power plant operating conditions.

Figure 13:
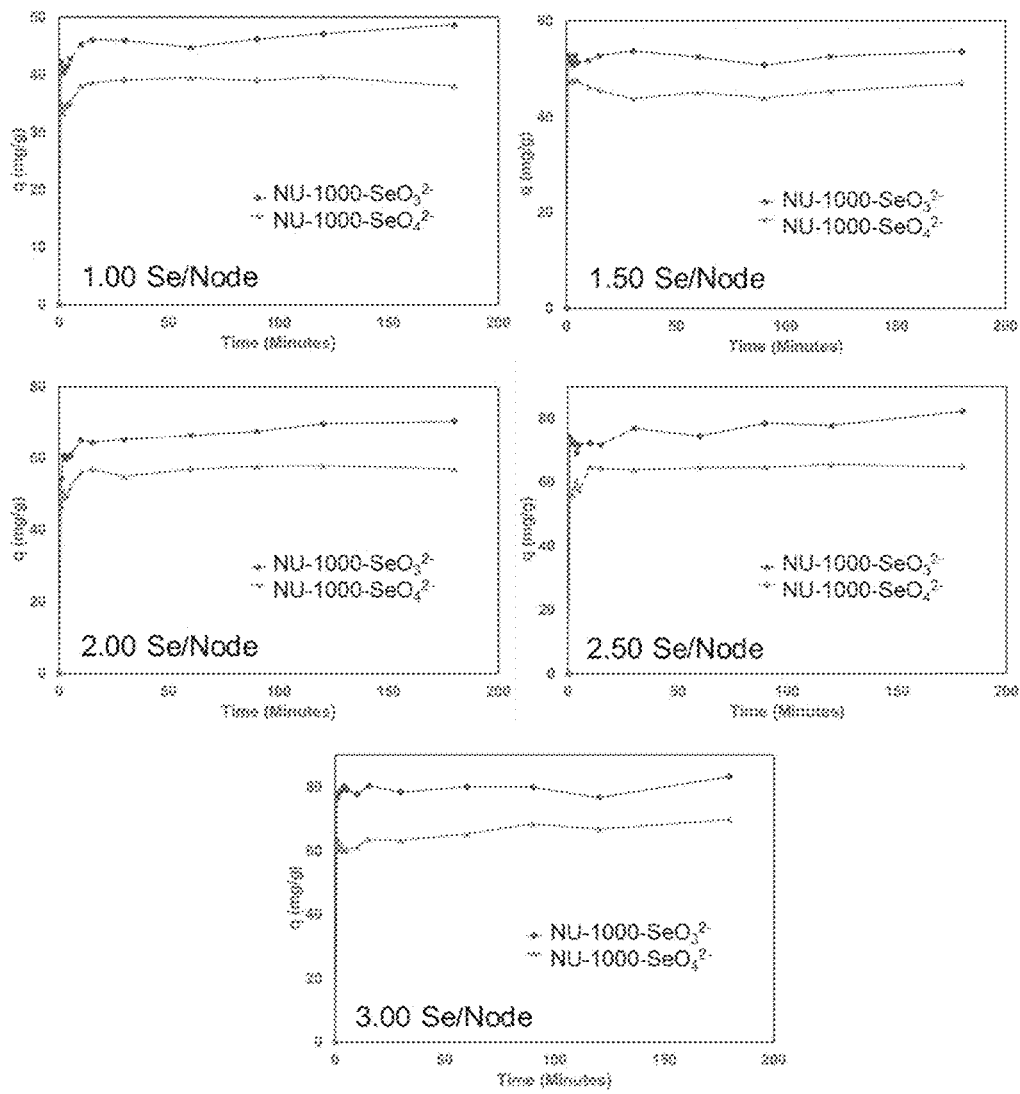
FIG. 13 illustrates the amount adsorbed (q) vs. time at various concentrations of selenate and selenite per node of NU-1000, wherein the amount adsorbed is presented in weight of the full oxy-anion in milligrams normalized by the weight of the bare NU-1000 MOF in grams.
Figure 14:
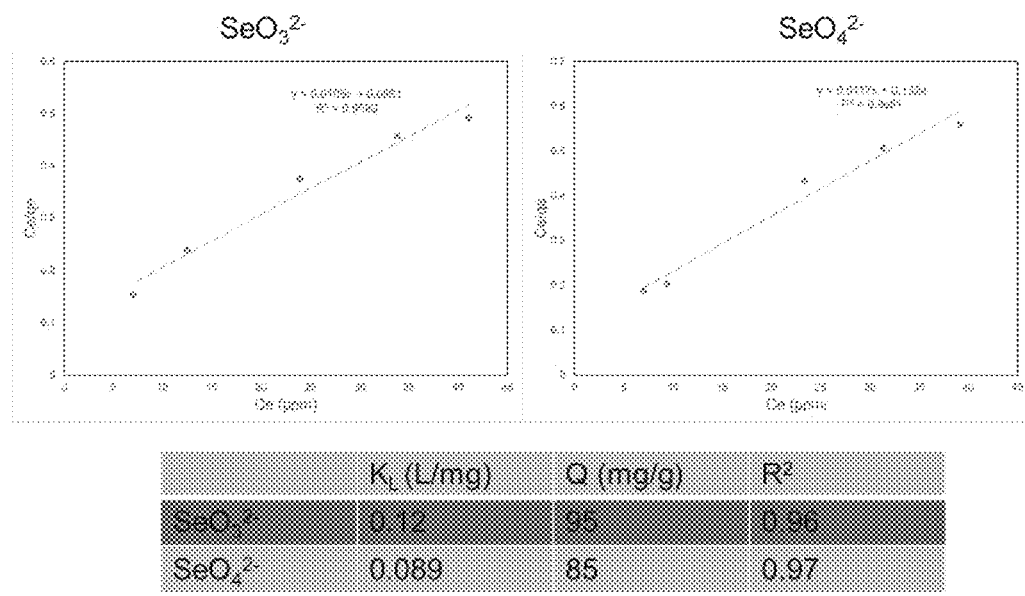
FIG. 14 illustrates a Langmuir plot (linear, type I) for selenite and selenate adsorption on NU-1000, with adsorbed amount as the weight of the full oxy-anions.

FIG. 13 illustrates the amount adsorbed (q) vs. time at various concentrations of selenate and selenite per node of NU-1000, wherein the amount adsorbed is presented in weight of the full oxy-anion in milligrams normalized by the weight of the bare NU-1000 MOF in grams. FIG. 14 illustrates a Langmuir plot (linear, type I) for selenite and selenate adsorption on NU-1000, with adsorbed amount as the weight of the full oxy-anions. The amount of selenite and selenate adsorbed per gram of NU-1000 was probed by exposing the MOF to various concentrations of selenite or selenate and monitoring the amount adsorbed (q) in mg of analyte/g of adsorbent over time (FIG. 13). Adsorption isotherm data was fit using the Langmuir model and high correlation coefficients were obtained (FIG. 14). Using the Langmuir equation, the maximum adsorption capacity (Q) of NU-1000 for selenite is 95 mg/g and for selenate is 85 mg/g. These data are roughly comparable to a millimole level of analyte per gram of uptake media. At amounts (i.e., concentrations and volumes) corresponding to 1.00 to 3.00 selenite or selenate anions per node, NU-1000 was found to reach its maximum adsorption within 1 minute of exposure (FIG. 13). The adsorption capacity of NU-1000 places it among the highest-capacity selenate and selenite adsorbing materials described to date; these analyte oxy-anions are much larger in size than the typical sulfate or chloride anion and are harder to achieve overall uptake capacity in many typical adsorption or ion exchange media available commercially. The uptake time of <1 minute in particular sets NU-1000 apart from other materials such as aluminum oxide and iron oxide derivatives as well as ion exchange and polymer resins, each of which require 30 or more minutes to reach maximum adsorption capacity under equivalent conditions. This feature, along with the low equilibrium final Se concentrations seen for NU-1000, is likely a manifestation of the significantly improved binding capability of the MOF for the larger oxy-anions when compared to other available adsorption media.

Adsorption capacity as a function of time at different concentrations (q) is given in FIG. 14 where $q=(C_i-C_f)\times V/m$ and $C_i$=initial concentration of selenate or selenite, $C_f$=final concentration at a given time, V=volume of selenate or selenite solution used and m=mass of NU-1000. For the Langmuir plots shown, the type I linear equation (FIG. 14) was used where $C_e$=equilibrium concentration of selenate or selenite in solution, $q_e$=equilibrium adsorption capacity, Q=maximum adsorption capacity of NU-1000 and KL=Langmuir adsorption constant. $q_e$ and $C_e$ are taken as the average values of q and $C_f$, respectively, from the analysis performed in FIG. 13 and described above.

TABLE S2

Values of $C_e$ and $q_e$ used in FIG. 14 for selenate and selenite adsorption on NU-1000.

| Selenite on NU-1000 | | | Selenate on NU-1000 | | |
| --- | --- | --- | --- | --- | --- |
| Ca. Per Node Exposure | $C_e$ (ppm) | $q_e$ (mg/g) | Ca. Per Node Exposure | $C_e$ (ppm) | $q_e$ (mg/g) |
| 1.00 | 7.0 | 45.9 | 1.00 | 7.0 | 37.1 |
| 1.50 | 12.5 | 52.3 | 1.50 | 9.4 | 46.2 |
| 2.00 | 23.9 | 63.8 | 2.00 | 23.3 | 53.8 |
| 2.50 | 33.9 | 73.9 | 2.50 | 31.3 | 61.6 |
| 3.00 | 41.0 | 83.4 | 3.00 | 39.1 | 69.9 |

Figure 15A:
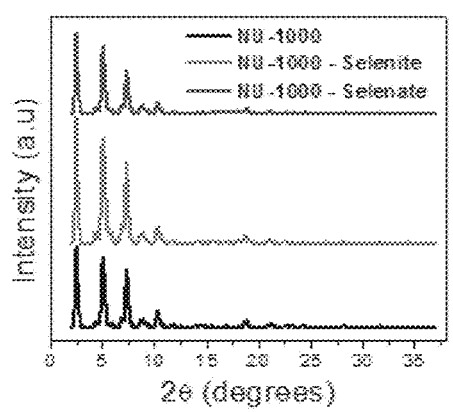
FIG. 15A illustrates a powder X-ray diffraction pattern of as-synthesized NU-1000 compared to NU-1000 after adsorption of selenite or selenate.
Figure 15B:
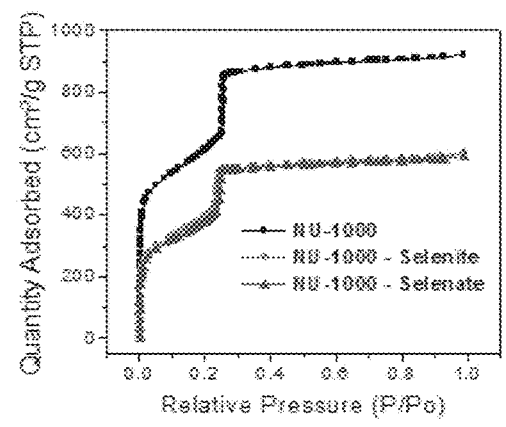
FIG. 15B illustrates a nitrogen adsorption isotherm of as-synthesized NU-1000 compared to NU-1000 after adsorption of selenite or selenate.

FIG. 15A illustrates a powder X-ray diffraction pattern of as-synthesized NU-1000 compared to NU-1000 after adsorption of selenite or selenate. FIG. 15B illustrates a nitrogen adsorption isotherm of as-synthesized NU-1000 compared to NU-1000 after adsorption of selenite or selenate. Characterization of NU-1000 before and after adsorption of selenate and selenite suggests that the framework remains intact. Powder X-ray diffraction patterns are unchanged before and after adsorption. The Brunauer-Emmett-Teller (BET) volumetric surface area of NU-1000 before adsorption is 1035±5 $m^2/cm^3$ (gravimetric surface area: 2130±5 $m^2/g$) whereas after adsorption of selenate and selenite the volumetric surface area drops slightly to 682±10 $m^2/cm^3$ and 705±10 $m^2/cm^3$ respectively (gravimetric surface area: 1240±10 and 1300±10 $m^2/g$) (FIG. 15B). Similarly modest decreases have been reported following Al(III) installation on NU-1000's nodes via atomic layer deposition.

Figure 16:
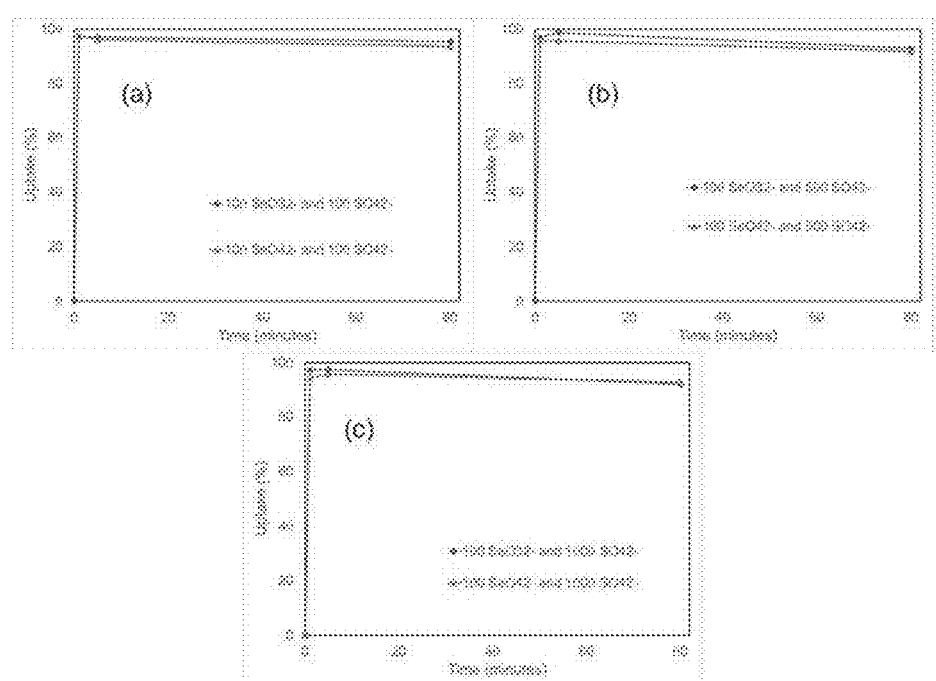
FIG. 16 illustrates selenate and selenite uptake as a function of time using 2 mg of NU-1000 and 10 mL of aqueous solution containing 100 ppb Se and (a) 100 ppb sulfur S and (b) 500 ppb S and (c) 1000 ppb S as sulfate.

FIG. 16 illustrates selenate and selenite uptake as a function of time using 2 mg of NU-1000 and 10 mL of aqueous solution containing 100 ppb Se and (a) 100 ppb sulfur S and (b) 500 ppb S and (c) 1000 ppb S as sulfate. Specifically, FIG. 16 illustrates the performance of the NU-1000 MOF using nodal uptake of selenate and selenite in the presence of competing sulfate anions.

Batch adsorption studies were performed for selenate and selenite uptake both in the presence of sulfate originally upon exposure to the bare MOF and as a "knock-off study" wherein sulfate was exposed to the MOF already having adsorbed the selenium oxy-anions. The competitive adsorption case was studied by exposing 2 mg of NU-1000 to 10 mL aqueous solutions containing 100 ppb Se as either $SeO_4^{2-}$ or $SeO_3^{2-}$ as well as 100, 500, or 1000 ppb S as $SO_4^{2-}$. In all cases, >95% of the Se in solution is adsorbed (FIG. 16) and the presence of $SO_4^{2-}$ (up to ten time higher concentration in ppb) has no effect on the $SeO_4^{2-}$ or $SeO_3^{2-}$ uptake at these concentrations. In addition, the remnant Se concentrations as $SeO_3^{2-}$ or $SeO_4^{2-}$ were found to be between 2-7 and 4-9 ppb Se, respectively.

The "knock-off" studies were performed by first exposing 2 mg of NU-1000 to 10 mL aqueous solutions containing 24 ppm $SeO_4^{2-}$ as $SeO_3^{2-}$ and $SeO_3^{2-}$. This is equivalent to an exposure level of 3.3 Se/node, which was used to insure that NU-1000 was saturated with $SeO_4^{2-}$ and $SeO_3^{2-}$. NU-1000-$2SeO_4^{2-}$ and NU-1000-$2SeO_3^{2-}$ was then exposed to an aqueous solution containing 25 ppm $SO_4^{2-}$ (equivalent to 3 S/node) and the leaching of $SeO_4^{2-}$ and $SeO_3^{2-}$ was probed as a function of time. There was minimal leaching (3%) of $SeO_3^{2-}$ from NU-1000-$2SeO_3^{2-}$ in the presence of $SO_4^{2-}$ whereas leaching of $SeO_4^{2-}$ from NU-1000-$2SeO_4^{2-}$ was more significant (20%) in the presence of $SO_4^{2-}$, but still low compared to many other types of adsorption media for which it is difficult even to obtain adsorption of both speciation of selenium oxy-anion without sulfate much less with a knock-off challenge.

The following describes the general methods used for the above analysis. UiO-66, UiO-66-NH2, UiO-66-$(NH_2)_2$, UiO-66-$(OH)_2$ and UiO-67 were made according to procedures described in Katz, M. J.; Brown, Z. J.; Colon, Y. J.; Siu, P. W.; Scheidt, K. A.; Snurr, R. Q.; Hupp, J. T.; Farha, O. K. A facile synthesis of UiO-66, UiO-67 and their derivatives. *Chem. Commun.* 2013, 49, 9449-9451, which is incorporated herein by reference in its entirety. NU-1000 was made according to a procedure described in Planas, N.; Mondloch, J. E.; Tussupbayev, S.; Borycz, J.; Gagliardi, L.; Hupp, J. T.; Farha, O. K.; Cramer, C. J. Defining the Proton Topology of the $Zr_6$-Based Metal-Organic Framework NU-1000. *J. Phys. Chem. Lett.* 2014, 5, 3716-3723, which is incorporated herein by reference in its entirety). Powder X-ray diffraction measurements were obtained using a Bruker MX IμS microsource with Cu—Kα radiation and an Apex II CCD detector. Measurements were made over a range of 2°<2θ<37°. $N_2$ adsorption and desorption isotherm measurements were performed on a Micromeritics Tristar II at 77K. Samples were activated by heating at 120° C. for 12 hours under high vacuum on a Micromeritics Smart VacPrep. All gases used were Ultra High Purity Grade 5 as obtained from Airgas Specialty Gases. DRIFTS were recorded on a Nicolet 6700 FTIR spectrometer equipped with an MCT detector that was cooled to 77 K. The spectra were collected in a KBr mixture under Argon purge (samples prepared in air). Pure KBr was measured as the background and subtracted from sample spectra. ICP-OES data were collected on a Varian Vista MPX ICP Spectrometer. ICP-MS data were collected on a ThermoFisher X Series II instrument equipped with Collision Cell Technology (CCT) to reduce interferences from doublets for accurate detection of Se. ICP standards were purchased from Fluka Analytical. The as-purchased Na and Se ICP standards were 1000 mg/L in 2% nitric acid, TraceCERT® and the Zr standard was 10 000 μg/mL in 4 wt % HCl. Standards for ICP-OES measurements (0.25-10 ppm) were prepared via serial dilution in 3% $H_2SO_4$ and standards for ICP-MS measurements (4-1000 ppb) were prepared via serial dilution in 3% $HNO_3$. Scattering data for PDF analysis were collected at beamline 11-ID-B at the Advanced Photon Source (APS) at Argonne National Laboratory (ANL). High energy X-rays (58.66 keV, λ=0.2114 Å) were used in combination with a Perkin Elmer amorphous silicon-based area detector. The samples were loaded into Kapton capillaries for PDF measurements under ambient conditions. PDF measurements were collected on NU-1000 samples containing selenate or selenite by taking 60 frames of 2 seconds exposure each. The 2-D scattering images were integrated to obtain 1-D scattering intensity data using software Fit2D. The structure function S(Q) was obtained within software PDFgetX3. Direct Fourier transform of the reduced structure function F(Q)=Q[S(Q)−1] led to the reduced pair distribution function, G(r), with $Q_{max}$=23 Å$^{-1}$. Contributions from the pristine MOF were measured under exactly same conditions and subtracted to yield differential PDF (dPDF). The dPDF data show the new contributions coming from Se-atom correlations. Models for Se coordination modes ($\eta_2\mu_2$ or $\mu_2$) to the MOF Zr-cluster were constructed within CrystalMaker. PDFs for both models were simulated using PDFGui[32] and compared with the experimental ones.

Initial selenite/selenate uptake studies were performed by exposing 10 mg of MOF to 5 mL of an aqueous, 100 ppm solution of selenium as sodium selenite or sodium selenate in a 15 mL polypropylene centrifuge tube. 100 ppm control solutions of sodium selenite and sodium selenate were also prepared. The solutions were centrifuged for 1 minute to allow the MOF to settle to the bottom of the tube. After 72 hours, 0.5 mL of the supernatant was removed and diluted to 10 mL in 3% $H_2SO_4$ for ICP-OES measurements. ICP-OES was used to determine the concentration of Se, Zr, and Na in each solution. Comparison of control solutions to those containing MOF was used to determine the amount of selenate or selenite adsorbed by the MOF.

Kinetic studies were performed by exposing 10 mg of UiO-66-$(NH_2)_2$, UiO-66-$NH_2$ and NU-1000 to 5 mL of an aqueous, 100 ppm solution of selenium as sodium selenite or sodium selenate in a 15 mL polypropylene centrifuge tube. The solutions were centrifuged for 1 minute to allow the MOF to settle to the bottom of the tube. 0.5 mL aliquots of the supernatant were removed at 3, 27, and 72 hours and diluted to 10 mL in 3% $H_2SO_4$ for analysis by ICP-OES. ICP-OES was used to determine the concentration of Se, Zr, and Na in each solution. Comparison of control solutions to those containing MOF was used to determine the amount of selenate or selenite adsorbed by the MOF at each time.

The maximum uptake per node of NU-1000 was determined by exposing 2 mg of NU-1000 to 5 ml of an aqueous solution of sodium selenite or sodium selenate in a 15 ml polypropylene centrifuge tube with selenium concentrations of 30, 45, 60, 75, 90, and 105 ppm. These concentrations correspond to an exposure level of 2-7 analyte molecules per MOF node (i.e., $Zr_6$ cluster). The solutions were centrifuged for 1 minute to allow the MOF to settle to the bottom of the tube. Aliquots of the supernatant were removed and diluted to 10 mL in 3% $H_2SO_4$ for analysis by ICP-OES. ICP-OES was used to determine the concentration of Se, Zr, and Na in each solution. Comparison of control solutions to those containing MOF was used to determine the number of selenate or selenite anions adsorbed per node of NU-1000.

Low concentration kinetic studies were performed by exposing six 2 mg samples of NU-1000 to 5 mL of an aqueous, 1 ppm solution of selenium as sodium selenite or sodium selenate in a 15 mL polypropylene centrifuge tube. The solutions were centrifuged for 1 minute to allow the MOF to settle to the bottom of the tube. 2895 μL aliquots of the supernatant were removed from each solution at different times (5, 10, 15, 30, 60, and 180 minutes) and diluted to 3 mL in 3% $HNO_3$ for analysis by ICP-MS. ICP-MS was used to determine the concentration of Se, Zr, and Na in each solution. Comparison of control solutions to those containing MOF was used to determine the amount of selenate or selenite adsorbed by the MOF at each time. Studies at 40° C. and pH 6 were performed in the same fashion. To perform tests at 40° C., the selenate and selenite solutions were heated in a beaker full of Lab ARMOR BEADS and to perform tests at pH 6 the selenate and selenite solutions were made in pH 6 HCl.

The amount of selenate or selenite adsorbed per gram of NU-1000 was determined by exposing 5 mg of NU-1000 to 10 mL of an aqueous solution of selenium as sodium selenite or sodium selenate in a 15 mL polypropylene centrifuge tube with concentrations of ca. 18, 27, 36, 45, and 55 ppm. These concentrations correspond to an exposure level of 1.00, 1.50, 2.00, 2.50 and 3.00 analyte molecules per $Zr_6$-node of NU-1000. The solutions were centrifuged for 30 seconds to allow the MOF to settle to the bottom of the tube. Aliquots of the supernatant were removed and diluted to 10 mL in 3% $H_2SO_4$ at 1, 2, 3, 4, 5, 10, 15, 30, 60, 90, 120, and 180 minutes for analysis by ICP-OES. ICP-OES was used to determine the concentration of Se, Zr, and Na in each solution. Comparison of control solutions to those containing MOF was used to determine the amount of selenate or selenite adsorbed (q) in mg/g of NU-1000 where $q=(Ci-Cf)\times V/m$, Ci=initial concentration, Cf=final concentration, V=volume of solution exposed to NU-1000 and m=mass of NU-1000 in g.

In use and according to one embodiment of the present invention, the MOF of the present invention can be used to selectively remove particular species from a liquid stream. The particular MOF can be attached to any structure that is used to facilitate contact between the liquid stream having the particular species to be removed and the MOF. For example, the MOF can be attached to precoatable filter/demineralizers or independent packed columns, including such devices already in use at a given facility or plant (e.g., existing vessels used for ion exchange). Thereafter, the structure can be appropriately mounted to allow contact between the liquid stream and the MOF on the structure. Once in contact with the liquid stream, the particular species to be removed is adsorbed onto the MOF, thereby reducing the concentration of that species in the liquid stream.

Because there exists in the literature established chemistries for altering the metal components of a MOF, one of sufficient expertise in the art ought to be able to produce MOFs related to NU-1000 that contain less expensive metal constituents, like using zirconium metal precursors which are only 90% pure and contain hafnium. In fact, in the present invention, one embodiment was tested in which an NU-1000 MOF analogue containing Zr:Hf within the nodal components at a ratio of 9:1. It was found in similar experiments as those prescribed above for NU-1000 itself, that the 90% Zr/10% Hf MOF indeed exhibited similar excellent nodal uptake of selenium derived oxy-anions (i.e., 90% to as high as 95% of the uptake seen with the pure Zr NU-1000 MOF), implying that commercial cost reduction should be possible through the use of less pure zirconium starting materials to make NU-1000.

Similarly, because there exist in the literature established chemistries for modifying the linker portion of a MOF, such as SALE (solvent assisted linker exchange) and SALI (solvent assisted ligand incorporation: see for example, P. Deria, W. Bury, J. T. Hupp and O. K. Farha, "Versatile Functionalization of the NU-1000 Platform by Solvent-Assisted Ligand Incorporation," *Chem. Commun.* 2014, 50, 1965-1068; and, P. Deria, J. E. Mondloch, O. Karagiardi, W. Bury, J. T. Hupp and O. K. Farha, "Beyond Post-Synthesis Modification: Evolution of Metal-Organic Frameworks via Building Block Replacement," *Chem. Soc. Rev.*, 2014, 43, 5896-5912), one of expertise in the art should be able to envision suitable algorithms for applying such chemistries to introduce into the NU-1000 MOF cavity appropriate ligand functionalities that further attract oxy-anions like selenate and selenite so as to enhance the overall binding capacity of the material for these analyte species and hence to improve engineering operations employing these media for water treatment functions. In the specific case of selenate or selenite, one linker chemistry expected by those expert in the art of theoretical bonding calculation is a functionalized urea chemistry, like a pyridyl-urea held pendant on a carbon or ether oxygen linear chain of sufficient length (for example, six to twelve elemental carbon or oxygen atoms long) to allow the urea derived ligand to contact the selenium oxy-anions that permeate the MOF cavity, with an appropriate terminal group to attach said ligand onto the MOF cavity and aperture forming components.

Finally, because it is known that generally one expert in the art should be able to derive regeneration procedures for anion removal media via acid treatment, such as but not limited to hydrochloric, sulfuric or nitric acid washes, so as to recover previously used removal media for re-use with the overall purpose of operation cost reduction. As such, one expert in the art should be able to subject MOFs to similar acid washing techniques to regenerate NU-1000 for continued re-use once saturated with oxy-anion impurity, such that overall cost of the water treatment operation employing the MOF is reduced to a point of economic feasibility.

Various embodiments of the invention have been described above. However, it should be appreciated that alternative embodiments are possible and that the invention is not limited to the specific embodiments described above. For example, in some embodiments, adsorption of aqueous selenate and selenite can be obtained by a series of highly porous, water stable, Zr-based MOFs. Of the seven MOFs examined, NU-1000 was found to exhibit both the highest gravimetric adsorption capacity and fastest rate of uptake. The results point to the importance of both large MOF apertures and substantial numbers of node-based adsorption sites, i.e. substitutional labile Zr(IV) coordination sites, for rapid and effective selenate and selenite adsorption and removal to occur. Both anions are shown to bind to the node in a bridging ($\eta_2\mu_2$) fashion where one di-anion bridges two zirconium metal centers. In contrast to many materials and associated technologies for selenium remediation, which are reasonably effective only for selenite, NU-1000 displays a strong affinity for both selenate and selenite.

What is claimed is:

1. A method for reducing the concentration of a selenium oxy-anion from a liquid stream, comprising:
   contacting a liquid stream comprising a selenium oxy-anion with a metal-organic framework; and
   complexing the selenium oxy-anion with a Zr node of the metal-organic framework wherein said complexing comprises $\eta_2\mu_2$ binding, thereby reducing the concentration of the selenium oxy-anion in the liquid stream.

2. The method of claim 1, wherein the metal-organic framework comprises $Zr_6(\mu_3\text{-}O)_4(\mu_3OH)_4(OH)_4(H_2O)_4$(TBAPy)$_2$, wherein TBAPy is 1,3,6,8-tetrakis (p-benzoic-acid)pyrene.

3. The method of claim 1, wherein the selenium oxy-anion is selected from the group consisting of selenate, selenite, and combinations thereof.

4. The method of claim 1, wherein the selenium oxy-anion comprises selenate and selenite and wherein said complexing reduces the concentration of selenate and selenite.

5. The method of claim 1, wherein said complexing reduces the concentration of the selenium oxy-anion in the liquid stream, thereby reducing the total selenium in the liquid stream to less than approximately 10 ppb.

6. The method of claim 1, wherein the liquid stream comprises sulfate.

7. The method of claim 1, wherein said complexing is performed at temperatures up to approximately 40° C.

8. The method of claim 1, wherein the metal-organic framework comprises nodes having a ratio of Zr to Hf of 9:1.

9. The method of claim 1, wherein the metal-organic framework comprises a ligand tethered to a portion of the metal-organic framework, and wherein said complexing comprises complexing a first selenium oxy-anion with a node of the metal-organic framework and complexing a second selenium oxy-anion with the ligand.

10. The method of claim 9, wherein the ligand comprises a substituted urea functionality.

11. The method of claim 1, wherein the liquid stream comprises a waste water stream from a flue gas desulfurization process.

12. A method for reducing the concentration of a selenium oxy-anion from a liquid stream, comprising:
   contacting a liquid stream comprising selenate and selenite with a metal-organic framework comprising a plurality of Zr nodes; and
   complexing the selenate with at least a first one of the Zr nodes of the metal-organic framework wherein said complexing and selenate comprises $\eta_2\mu_2$ binding, thereby reducing the concentration of the selenate oxy-anion in the stream; and
   complexing the selenite with at least a second one of the Zr nodes of the same metal-organic framework wherein said complexing the selenite comprises $\eta_2\mu_2$ binding, thereby reducing the concentration of the selenite in the liquid stream.

13. The method of claim 12, wherein the metal-organic framework comprises $Zr_6(\mu_3\text{-}O)_4(\mu_3OH)_4(OH)_4(H_2O)_4$(TBAPy)$_2$, wherein TBAPy is 1,3,6,8-tetrakis (p-benzoic-acid)pyrene.

14. The method of claim 12, wherein the metal-organic framework comprises nodes having a ratio of Zr to Hf of 9:1.

15. The method of claim 12, wherein said complexing the selenate and said complexing the selenite reduce the total selenium concentration to less than approximately 10 ppb.

16. The method of claim 15, wherein the liquid stream comprises sulfate.

17. The method of claim 16, wherein said complexing the selenate and said complexing the selenite are performed at temperatures up to approximately 40° C.

18. The method of claim 5, wherein the total selenium in the liquid stream is reduced to less than approximately 2 ppb.

* * * * *